United States Patent [19]
Froud

[11] Patent Number: 5,695,651
[45] Date of Patent: Dec. 9, 1997

[54] INLET SCREEN

[75] Inventor: David P. Froud, Maidstone, United Kingdom

[73] Assignee: Apoc Limited, Kent, England

[21] Appl. No.: 591,488
[22] PCT Filed: Jul. 13, 1994
[86] PCT No.: PCT/GB94/01516
§ 371 Date: Jan. 11, 1996
§ 102(e) Date: Jan. 11, 1996
[87] PCT Pub. No.: WO95/02440
PCT Pub. Date: Jan. 26, 1995

[30] Foreign Application Priority Data

Jul. 13, 1993 [GB] United Kingdom ............ 9314535

[51] Int. Cl.$^6$ .................. B01D 35/027; B01D 29/27
[52] U.S. Cl. .............. 210/758; 210/798; 210/209; 210/220; 210/262; 210/151; 210/356; 210/474; 210/475; 261/4; 261/5; 261/6
[58] Field of Search ................. 210/768, 797, 210/798, 209, 216, 220, 262, 448, 356, 411, 412, 474, 475, 476, 499, 151, 758; 261/5, 6, 4

[56] References Cited

U.S. PATENT DOCUMENTS

| | | |
|---|---|---|
| 1,095,494 | 5/1914 | Edey . |
| 1,208,882 | 12/1916 | Young . |
| 1,401,723 | 12/1921 | Palich . |
| 1,666,164 | 4/1928 | Chappell . |
| 1,728,381 | 9/1929 | Waters . |
| 1,734,999 | 11/1929 | Cruickshank . |
| 1,824,350 | 9/1931 | Hosking . |
| 2,792,943 | 5/1957 | Mackintosh . |
| 3,419,151 | 12/1968 | Smith . |
| 3,756,410 | 9/1973 | Moody . |
| 3,923,656 | 12/1975 | Krebs . |
| 5,178,752 | 1/1993 | McKinnon . |
| 5,234,632 | 8/1993 | Schmidt . |
| 5,487,829 | 1/1996 | Safferman . |

FOREIGN PATENT DOCUMENTS

| | | |
|---|---|---|
| 3924658 | 1/1991 | Germany . |
| 4305207 | 10/1992 | Japan . |

*Primary Examiner*—Thomas M. Lithgow
*Attorney, Agent, or Firm*—Lowe, Price, LeBlanc & Becker

[57] ABSTRACT

The invention relates to the treatment of liquid waste such as sewage. The invention provides a method of screening of liquid waste to remove solid material therefrom, comprising passing the liquid waste in a downward stream through a suspended sack filter, and agitating the sack filter and the liquid stream by discharging a stream of bubbles upwardly through the liquid from below the sack filter. The invention also provides an inlet screen, comprising an upright hollow column (1), having an opening at the top across which a sack filter (6) is positioned, the sack filter extending downwardly into the column, and an air diffuser (8) at the lower end of the column, and an outlet (5, 23, 34) from the column, whereby in use liquid waste flows into the top of the column, through the sack filter to the outlet, the sack filter and liquid waste being agitated by discharge of air from the air diffuser.

8 Claims, 4 Drawing Sheets

INLET SCREEN

This invention relates to the treatment of liquid waste such as sewage, and more particularly relates to apparatus for screening raw sewage before it proceeds to biological or other treatment.

In sewage treatment plants, it is necessary to screen the inflow of raw sewage before further treatment. The screening process removes non-biodegradable solid material such as condoms, tampons, nappy liners etc. A variety of inlet screens are available on the market. Many of them, such as rake bar screens, produce screenings with a high content of faecal matter which require washing. Coarse screens let through an unacceptable amount of solid materials. Fine screens tend to block (known as "blinding") very easily.

The present invention overcomes the above problems by making use of an air system which imparts energy and agitation to a screening sack. The invention provides a method of screening of liquid waste to remove solid material therefrom, comprising passing the liquid waste in a downward stream through a suspended sack filter, and agitating the sack filter and the liquid stream by discharging a stream of bubbles upwardly through the liquid from below the sack filter.

The invention also provides an inlet screen, comprising an upright hollow column, having an opening at the top; a sack filter suspended with its open end at or near the opening of the column, the sack extending downwardly into the column; an air diffuser at the lower part of the column; and an outlet from the column, whereby in use liquid waste flows into the top of the column, through the sack filter to the outlet, the sack filter and liquid waste being agitated by discharge of air from the air diffuser.

The air diffuser produces streams of air bubbles which pass upwardly through the liquid in the column. This results in agitation both of the liquid waste itself and also of the sack filter. This agitation helps to prevent the sack filter from blinding, it breaks down faecal matter in the liquid waste, and it improves washing of the screenings.

Preferably means are provided for ensuring a level of liquid waste in the column between the lowermost and uppermost parts of the sack filter.

BRIEF DESCRIPTION OF THE DRAWINGS

Reference is now made to the accompanying drawings, in which:

In FIG. 1, the column comprises a cylindrical tube 1 of plastics or other suitable material, such as UPVC. The tube is arranged generally upright. The lower end of the tube 1 has a flanged connection 2 to a lower reservoir or "bucket" 3, which may also suitably be of UPVC. The bucket 3 has a slightly greater diameter than the tube 1. The top of the tube 1 is open to receive inflow 4 of crude sewage, and an outlet 5 is provided at the base of the tube, just above the flanged connection 2.

Figure 1:
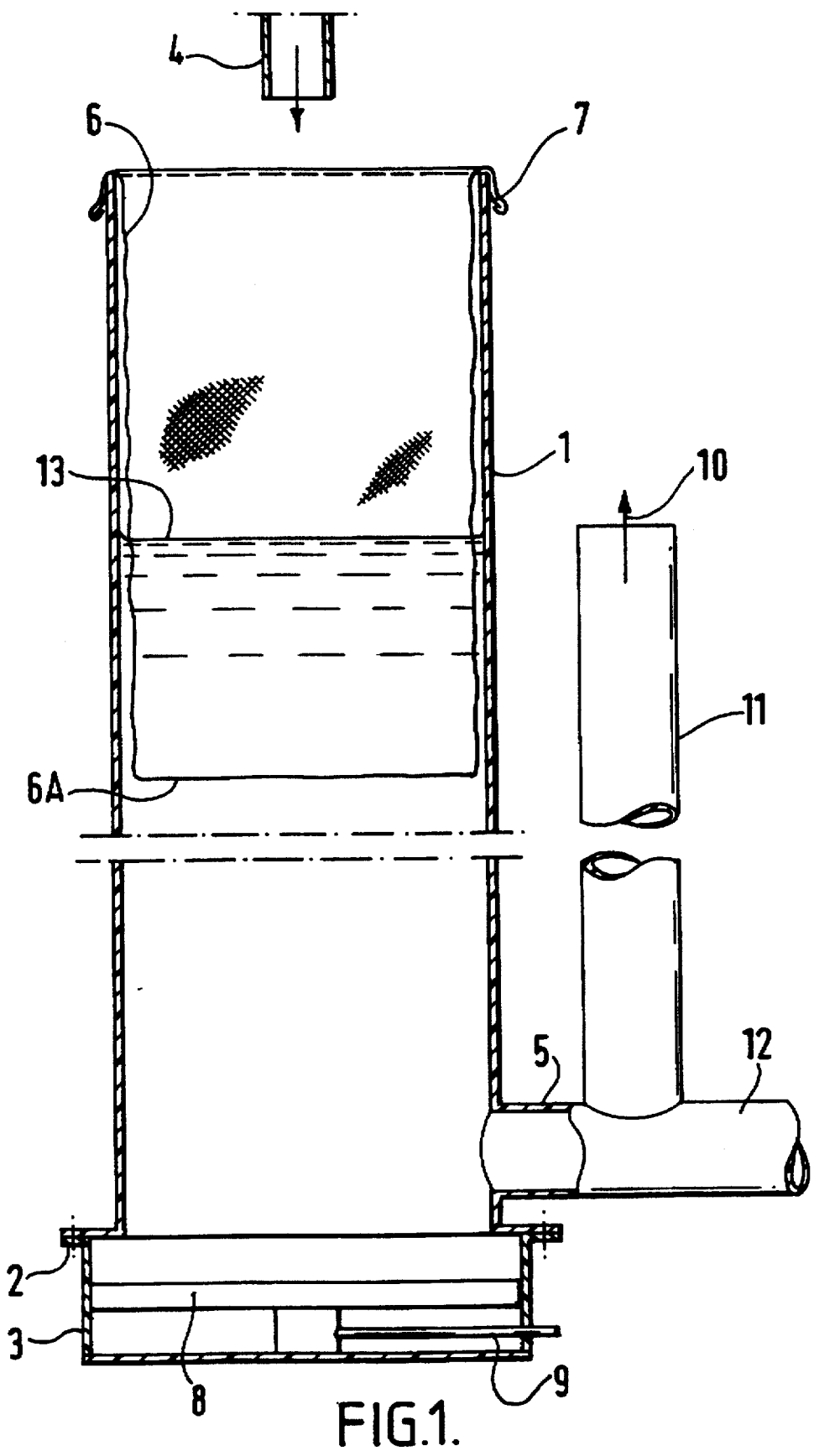
FIG. 1 is a diagrammatic side view, partly in section of an inlet screen according to one embodiment of the invention.

A sack filter 6 is positioned across the top end of the tube 1 and held in place by retention clips 7 fitted to the side of the tube. The sack filter 6 extends to its lower end 6A some distance down into the tube from the top. A suitable grade of sack filter is one having 4 mm×2 mm holes, although filters with other size holes can be used depending on the degree of filtration which is required.

In the bucket 3, an air diffuser 8 is arranged, so as to direct a stream of air bubbles upwardly through the liquid in the tube. The air diffuser 8 is provided with an air supply pipe 9 which passes through a side wall of the bucket to external air supply means. The air diffuser is suitably of the diaphragm or membrane type. This comprises a flexible multi-perforated membrane. When air is supplied, the membrane partly inflates and streams of fine air bubbles escape from the multiple perforations.

The air diffuser can be controlled by suitable switching means. To save energy, the air supply to the diffuser can be switched on and off in conjunction with the inflow of crude sewage. To improve agitation, the air flow can be pulsed, for example by means of a solenoid valve, which can improve the degree of agitation if necessary.

The inflow 4 of crude sewage passes into the top of the tube and through the sack filter 6. It exits through the outlet 5 as outflow 10 which may then pass to suitable treatment means. The upflowing stream of air bubbles from the air diffuser 8 agitates both the liquid and the sack filter. Without such agitation, the sack filter may blind in as little as ten minutes, but with agitation the sack pores will remain open for an extended time. Such a unit may therefore be capable of screening the flow from a population of 500 people.

The outlet 5 comprises an upflow pipe 11 and a drain 12. The drain 12 is normally closed by a valve (not shown). The upflow pipe 11 is connected at its upper end to subsequent treatment steps. The level of liquid in the upflow pipe 11 ensures a reasonably constant liquid effluent level 13 in the column 1, this level being between the bottom end 6A and the top of the sack filter 6. This ensures that floating waste matter is less likely to block the sack filter. In an alternative arrangement (not shown) the joint between the outlet 5 and tube 1 is rotatable, so that the height of the outlet 10 (and hence the level 13) is adjustable.

An inlet screen such as the above results in cleaner screenings than conventional methods. It can screen down to 4 mm or even less. It breaks down faecal matter in the crude sewage, and it aids in biological degradation.

Figure 2:
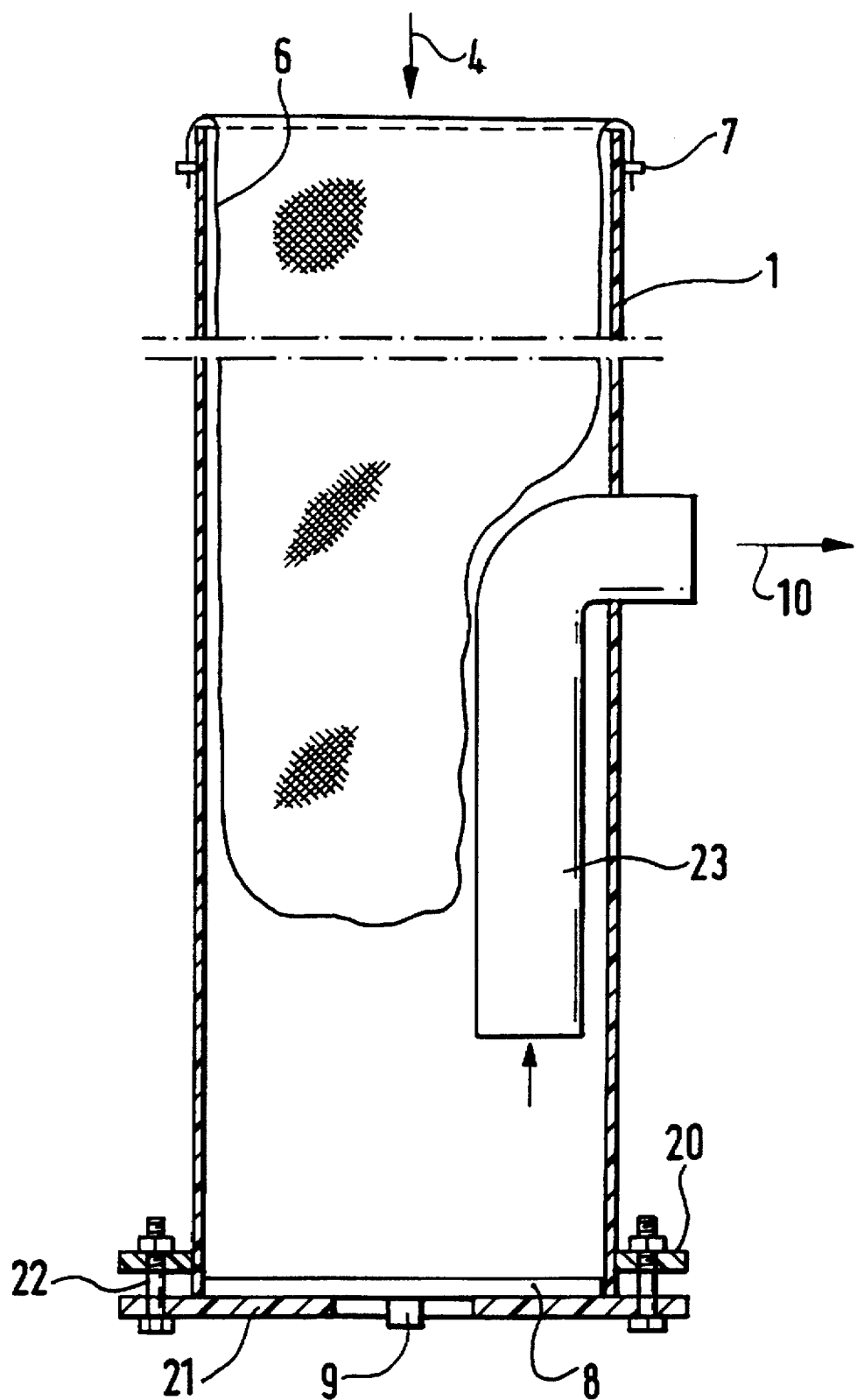
FIG. 2 is a diagrammatic side view of an inlet screen according to another embodiment of the invention.

In FIG. 2, those parts which correspond to FIG. 1 have the same reference numerals. The tube 1 again has a sack filter 6 fitted across its top by clamps 7. Instead of the air diffuser 8 being arranged in a lower bucket, it is fitted directly above a lower plate 21 which is fitted across the lower end of the tube 1. The plate 21 is clamped by bolts 22 to a peripheral outer flange 20 at the bottom of the tube 1. The plate 21 includes a central opening for the air connection 9. The membrane of the air diffuser 8 thus occupies the entire cross-sectional area of the tube 1, and this provides the advantage of avoiding "dead" areas where there is no aeration.

The outflow 10 is from a level about ¾ of the way up the tube 1. This is achieved by means of an internal upflow tube 23, which is positioned to one side of the interior of the tube 1, and which has a 90° turn at its upper end, passing through a joint in the side of the tube 1. The sack filter 6 simply passes to one side of the upflow tube 23. An advantage of this arrangement is that the upward flow of air bubbles from the diffuser 8 helps to entrain liquid upwardly through the upflow tube 23, and through the outflow 10.

Figure 3A:
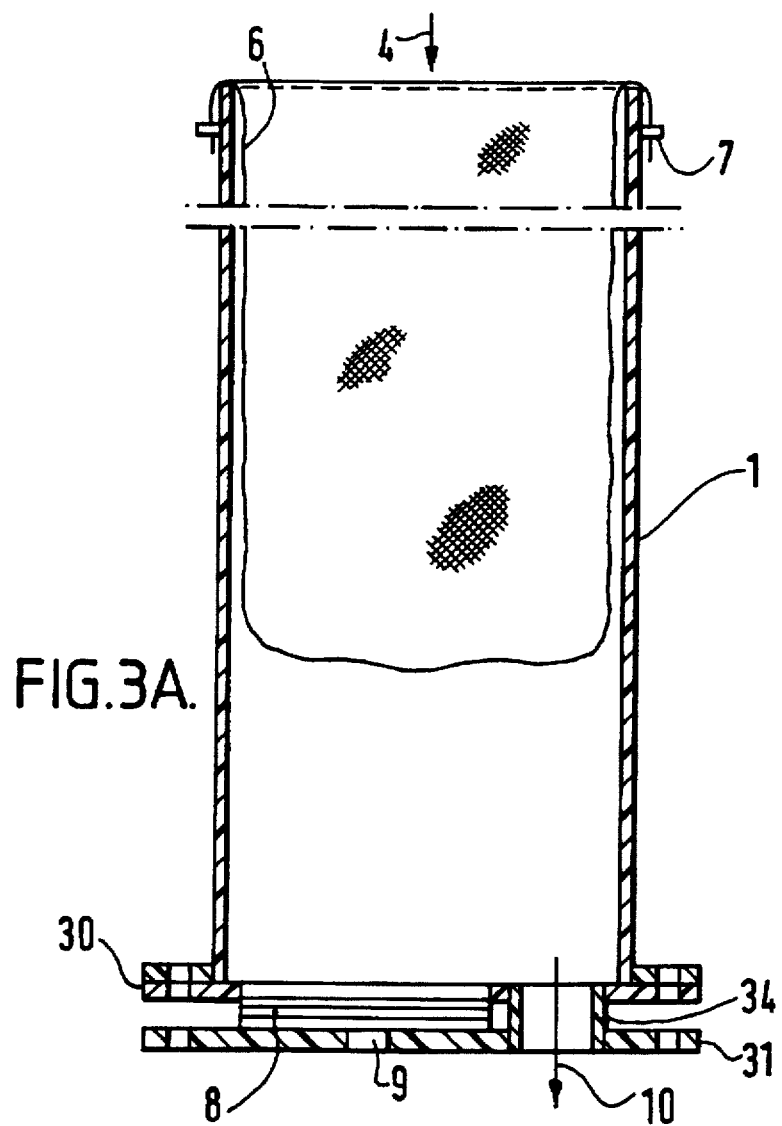
FIG. 3A is a diagrammatic side view and FIG. 3B a transverse section of a further embodiment.
Figure 3B:
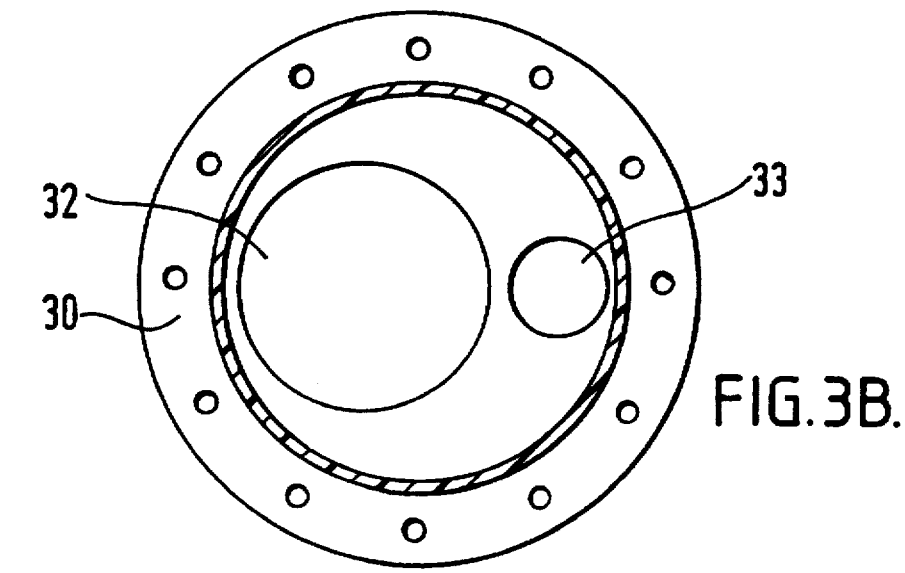

In FIGS. 3A and 3B, the sack filter 6 is again fitted to the top of the upright tube 1 by clamps 7. In this embodiment, the outflow 10 is through an opening in the base of the tube 1. The air diffuser 8 is fitted between an upper plate 30 and a lower plate 31. FIG. 3B is a transverse cross-section at the level of the upper plate 30. The plates 30 and 31 are bolted to a peripheral outer flange at the base of the tube 1. As shown in FIG. 3B, the plate 30 has two holes, a larger hole 32 which corresponds to the area of the membrane of the diffuser 8, and a smaller hole 33 which provides a liquid outlet. The lower plate 31 has a hole corresponding to the smaller hole 33 in the plate 30, and these two holes are joined by an outlet pipe 34. The membrane of the air diffuser 8 is fitted to the lower plate 31 and occupies an area corresponding to the area of the larger hole 32 in the plate 30. An opening 9 in the lower plate 31 is provided for supply of air to the diffuser. In use, the membrane of the diffuser 8 expands into the opening 32 in the plate 30, and provides an upward flow of air bubbles through the liquid in the interior of the tube 1. In some situations, it is advantageous for the outflow 10 of liquid to be through the bottom of the tube 1, and the arrangement in FIGS. 3A and 3B illustrates how this can be designed. A disadvantage of this arrangement, however, is that the air diffuser does not occupy the entire cross-sectional area of the tube 1, and there is therefore a risk of "dead" areas in the liquid which are not fully aerated.

Figure 4A:
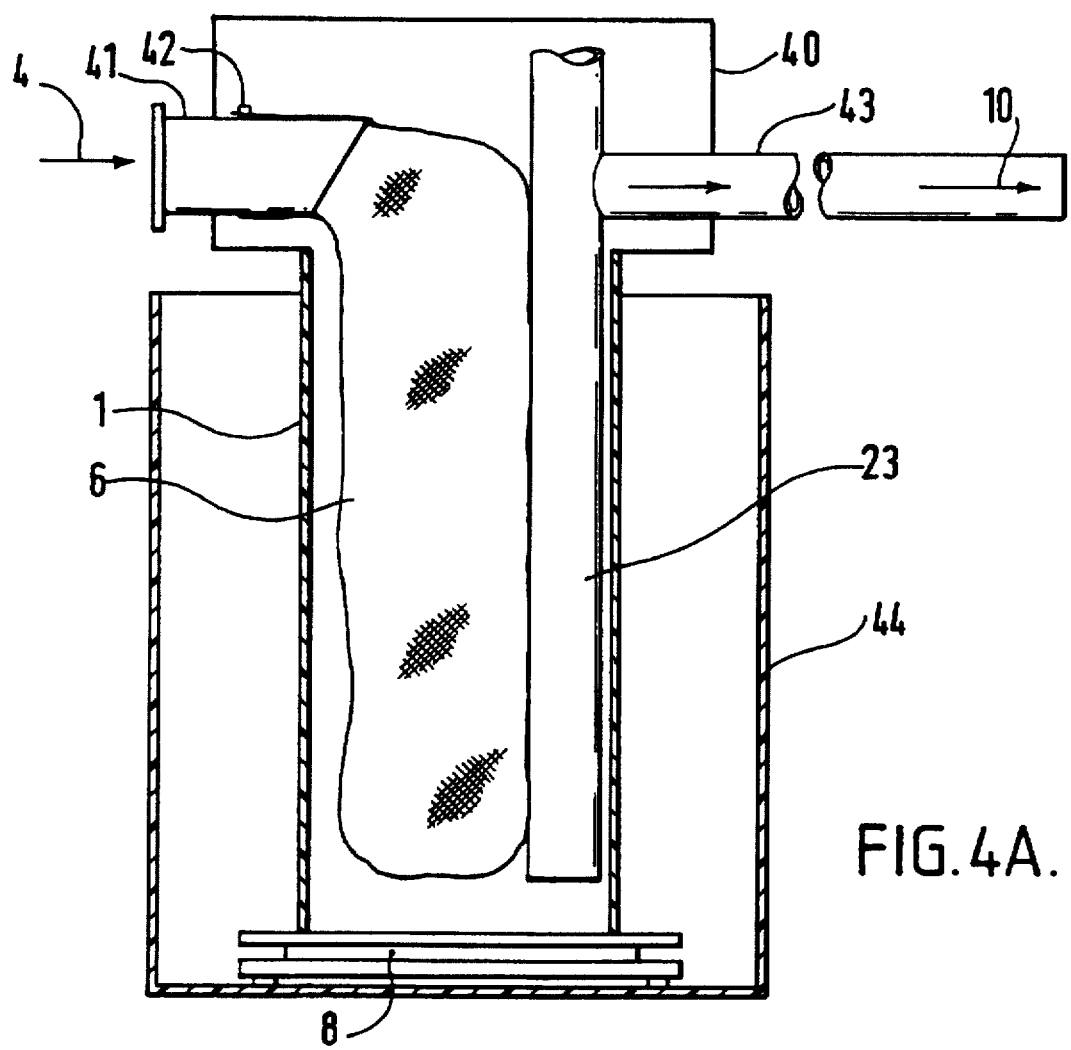
FIG. 4A is a diagrammatic side view and FIG. 4B a plan view of a still further embodiment.
Figure 4B:
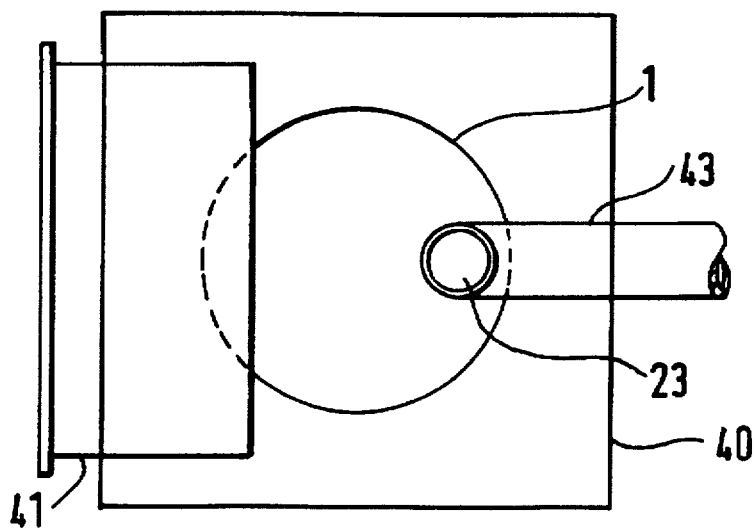

In FIGS. 4A and 4B, the upright tube 1 is generally cylindrical and the air diffuser 8 is mounted at the bottom in the same way as in FIG. 2. The upper end of the tube 1 opens into a square or rectangular part 40. The flat sides of the part 40 make it easier to fit and seal inlet and outlet connections. The inlet 4 is through a nosebox 41 mounted in one wall of the part 40. The nosebox has a flanged inlet and an overhanging outlet, and is provided with clamping points 42 for attachment of the open end of the sack filter 6. The outflow 10 is arranged similarly to FIG. 2, and includes an internal upflow tube 23, having a side arm 43 near its upper end, which passes through a side wall in part 40. The lower part of the assembly fits in a chamber 44, which may be in the ground.

As in FIG. 2, the discharge pipe 23 is mounted above the diffuser to give lift to the discharging effluent and encourage suspended solids to discharge with the effluent (rather than settle immediately above the diffuser). The opening out of the top of the tube 1 into part 40 allows the head created by the aeration to dissipate over a larger surface area and not interfere with the incoming effluent.

I claim:

1. An inlet screen, comprising an upright hollow column (1), said column containing liquid and having an opening at the top; a sack filter having an open upper end for receiving waste liquid and a closed lower end, said sack filter being positioned with its open end at or near the opening of the column, the sack filter extending downwardly into the liquid in the column; an air diffuser (8) at the lower end of the column; and an outlet (5, 23, 34) from the column, whereby in use liquid waste flows into the top of the column, said liquid flows through the sack filter to the outlet, the sack filter and liquid in said column being agitated by discharge of air from the air diffuser.

2. An inlet screen according to claim 1, in which the outlet (5) is from a side wall near the base of the column (1), and includes an upflow pipe (11) to enable the level of liquid in the column (1) to be adjusted.

3. An inlet screen according to claim 1, in which the outlet (23) includes an internal upflow tube, within the column (1), the upflow tube exiting at its upper end through a side wall of the column (1).

4. An inlet screen according to claim 1, in which the outlet (34) is through the base of the column (1).

5. An inlet screen according to claims 1, in which the air diffuser (8) comprises a flexible multi-perforated membrane adapted to expand on inflation with air and thereby to release a stream of fine air bubbles through said liquid.

6. An inlet screen according to claim 5, in which the membrane of the air diffuser (9) occupies the entire cross-sectional area of the column (1).

7. A method of screening of liquid waste to remove solid material from a liquid, comprising suspending a sack filter having an open upper end and a closed lower end in the liquid, passing the liquid waste in a downward stream through said open upper end of said suspended sack filter, and agitating the sack filter wherein said liquid flows through said sack filter and the liquid by discharging a stream of bubbles upwardly through the liquid from below the sack filter.

8. A method according to claim 7, in which the stream of liquid waste flows through an upright hollow column (1) containing the liquid, the sack filter (6) being suspended across the open top of the column (1) and extending downwardly into the liquid in said column, the liquid waste flowing into the top of the column, through the sack filter (6) and said liquid flowing to an outlet from the column, and an upward stream of air bubbles being produced by an air diffuser (8) at the base of the column, thereby to agitate the sack filter (6) and the liquid in the column.

* * * * *